United States Patent Office 2,950,205
Patented Aug. 23, 1960

2,950,205

MOLD PART COMPOSITION AND PROCESS OF MAKING SAME

James Cardaras, Midlothian, Ill., assignor to International Harvester Company, Chicago, Ill., a corporation of New Jersey No Drawing. Filed May 6, 1958, Ser. No. 733,420

9 Claims. (Cl. 106—38.3)

This invention relates to the art of founding particularly the composition of and process for making mold parts such as, for example, cores.

The art of making foundry mold parts from silica and hydrates of calcium sulfate has been proposed for foundry use. In particular the patent to Ensign et al., U.S. Patent No. 2,539,408, discloses an excellent composition and method for making mold parts from silica flour and the hydrates of calcium sulfate which is quite suitable for use in casting a large number of foundry products. However, where variation in dimensions of castings must be held to precise limits of small magnitude, investment or precision casting methods requiring expensive ingredients such as organic silicates have been employed. Although these latter methods produce excellent smooth castings having very small tolerance in dimensional variation, they are used only in a relatively few applications because of the high cost. This leaves a field of applications where the dimensional stability of the castings required is greater or better than that resulting from mold parts made in accordance with the disclosure of U.S. Patent No. 2,539,408 without a substantial increase in cost. An example of such an application is the cores employed in casting the vane sections of aluminum alloy impeller members for torque converters. These vanes are thin walled and to function properly must be of small variation in dimensional or distortion tolerance. Most of the cores experimentally made pursuant to the above mentioned patent were unsuitable and thus rejected because the dimensional stability property was of insufficient order in magnitude.

Accordingly, it is a prime object of this invention to provide mold parts having the necessary properties for producing smooth castings of dimensionally precise quality.

A further object of this invention is to provide mold parts, according to the preceding object, at low cost and having improved dimensional stability properties.

A still further object of this invention is to provide a composition of matter and process therefor for producing mold parts in accordance with the preceding objects.

These and further objects of the invention will become readily apparent from the ensuing description of an embodiment of the invention and the appended claims.

The basic ingredients used in making these mold parts is a mixture of finely divided (325 mesh was found to be satisfactory) anhydrous calcium sulfate or the hemihydrate of calcium sulfate, silica flour, water and a small percentage of Portland cement. Where rapid setting is desired the hemihydrate of calcium sulfate should be used rather than the anhydrous type.

The first step in the preparation of the composition of this invention approximately 30 percent by weight of finely divided powdered hemihydrate of calcium sulfate or the equivalent of anhydrous calcium sulfate (calculated as the hemihydrate $CaSO_4 \cdot \frac{1}{2}H_2O$) is intimately mixed in a dry state with about 70 percent silica flour also in finely divided powdered form (325 mesh was found to be satisfactory). To this mixture is then added enough water to cause hydration of the sulfate to convert at least part of the sulfate to the dihydrate ($CaSO_4 \cdot 2H_2O$) form and allowing the mass to set. For example, water in the amount of 56 percent by weight based on the powder mixture was added and stirred by a power stirrer for 7 minutes and was found to be satisfactory. The mixture or slurry thus formed is placed into a flat bottomed pan to a depth of about 1 inch for setting. In about 11 minutes after pouring the setting of the mixture reaches a consistency suitable for cutting into blocks each about 1″ x 1½″ x 1½″. If anhydrous calcium sulfate is used a longer setting time will be required. The blocks in about 30 minutes after pouring are then placed in a furnace or oven at a temperature not less than 265° F. to convert the dihydrate of calcium sulfate at least, in part, to the hemihydrate of calcium sulfate and to react at least a portion of the sulfate with the silica flour forming silicates of calcium intermixed with free silica and calcium sulfate. For example, about 30 minutes after pouring the blocks are placed in a furnace at 800° F. for 2 hours and allowed to cool in a dry place.

The material thus obtained is ground into finely divided powder having a particle size about that of the originally used silica flour. For convenience this powder thus made may be designated as a first admixture.

The second step in the preparation of the composition of this invention approximately 30 percent by weight of finely divided powdered hemihydrate of calcium sulfate or the equivalent of anhydrous calcium sulfate (calculated as the hemihydrate $CaSO_4 \cdot \frac{1}{2}H_2O$) is intimately mixed in a dry state with about 70 percent silica flour also in finely divided powdered form. To this mix is added a relatively small amount of Portland cement in finely divided powdered form. For example, 0.25 percent by weight of Portland cement by weight may be added yielding good results. The powdered mix thus obtained may for convenience be termed a second admixture.

The third step in the preparation of the composition of this invention is the intimate blending together in equal proportions by weight of the first admixture with the second admixture in a dry state. The composition thus obtained is ready for making mold parts.

To the composition described as the third step above is added water in an amount necessary to permit the mass after stirring to pour as a fluid. The conglomeration thus obtained is then poured into a core-forming box or mold part forming box and allowed to set. After the mass has set firmly the mold part forming box may be removed.

A series of specimen cores were made using a conventional core mold wherein the mean distance between two designated points of each core thus made was 5.6250 inches. The test results were made by measuring each core thus made between the two designated points and the deviation from the mean distance of 5.6250 inches recorded. The following Table I illustrates the deviation from the normal size of 5.6250 inches of each specimen core as measured 12 hours after pouring. The Portland cement content shown in Table I is expressed in terms of percent by weight.

From Table I it can be seen that all cores made without the Portland cement ingredient expanded. The average expansion was +0.0087 inch with a high value of +0.0140 inch and low value of +0.0045 inch. When as little as 0.0625 percent of Portland cement was added the average expansion was only +0.0018 inch. However, when the Portland cement content was increased to 0.125 percent some of the results obtained were negative indicating a slight shrinkage while the remainder expanded slightly. The average of the expansion values of this

Table I

| Portland Cement, Percent | Deviation, Inches | Portland Cement, Percent | Deviation, Inches |
|---|---|---|---|
| 0 | +0.0055 | 0.125 | -0.0002 |
| 0 | +0.0052 | 0.125 | -0.0015 |
| 0 | +0.0080 | 0.125 | -0.0008 |
| 0 | +0.0082 | 0.125 | +0.0016 |
| 0 | +0.0072 | 0.125 | -0.0025 |
| 0 | +0.0097 | 0.125 | -0.0003 |
| 0 | +0.0087 | 0.125 | -0.0007 |
| 0 | +0.0082 | 0.125 | +0.0002 |
| 0 | +0.0087 | 0.125 | +0.0002 |
| 0 | +0.0092 | 0.125 | -0.0008 |
| 0 | +0.0085 | 0.125 | +0.0022 |
| 0 | +0.0045 | 0.125 | +0.0030 |
| 0 | +0.0057 | 0.125 | +0.0007 |
| 0 | +0.0070 | 0.125 | +0.0027 |
| 0 | +0.0097 | 0.125 | +0.0010 |
| 0 | +0.0095 | 0.125 | -0.0002 |
| 0 | +0.0047 | 0.125 | +0.0003 |
| 0 | +0.0080 | 0.125 | +0.0013 |
| 0 | +0.0087 | 0.125 | -0.0005 |
| 0 | +0.0140 | 0.125 | -0.0010 |
| 0 | +0.0135 | 0.125 | -0.0001 |
| 0 | +0.0135 | 0.125 | -0.0003 |
| 0 | +0.0140 | 0.125 | -0.0015 |
| 0 | +0.0112 | 0.125 | +0.0010 |
| 0 | +0.0072 | 0.125 | -0.0011 |
| 0 | +0.0062 | 0.125 | -0.0005 |
| 0 | +0.0065 | 0.125 | +0.0003 |
| 0 | +0.0050 | 0.125 | +0.0007 |
| 0 | +0.0065 | 0.125 | +0.0012 |
| 0 | +0.0122 | 0.125 | +0.0002 |
| 0 | +0.0095 | 0.125 | +0.0002 |
| 0 | +0.0117 | 0.125 | -0.0017 |
| 0 | +0.0085 | 0.125 | +0.0010 |
| 0 | +0.0085 | 0.125 | +0.0001 |
| 0 | +0.0080 | 0.125 | +0.0012 |
| 0 | +0.0125 | 0.125 | +0.0003 |
| 0 | +0.0090 | 0.250 | +0.0006 |
| 0.0625 | +0.0013 | 0.250 | +0.0011 |
| 0.0625 | +0.0011 | 0.250 | +0.0001 |
| 0.0625 | +0.0007 | 0.250 | -0.0003 |
| 0.0625 | +0.0023 | 0.250 | +0.0003 |
| 0.0625 | +0.0022 | 0.250 | +0.0006 |
| 0.0625 | +0.0031 | | | latter group was +0.0009 inch with a maximum value of +0.0030 inch while the average of the shrinkage values was -0.0008 inch with a maximum shrinkage value of -0.0025 inch. These cores were found to be free of distortion as they could be replaced in the core forming box properly while those made without Portland cement were found to be distorted sufficiently that generally they could not be re-inserted in the core forming box. Increasing the amount of Portland cement to 0.25 percent by weight showed no substantial improvement over that when 0.125 percent cement was added. Thus increasing the Portland cement content say above 3 percent may not produce further improved results.

At this point it should be added that where the cores thus made according to this invention are to be employed in molding higher temperature melting metals such as bronze, the cores should be baked at approximately 400° F. for a period necessary to remove residual moisture therefrom. The length of baking time required, of course, will vary in accordance with the dimensional character of the core.

From the foregoing it can readily be seen that the addition of a small percentage by weight of Portland cement to a previously known core composition produces a new and better result in that the dimensional stability of the product is much improved and of precision quality. It must be understood, however, that the various formulations above described are not intended in a limiting sense and that various changes in materials and percentages may be made which do not depart from the scope thereof as defined in the appended claims.

What is claimed is:

1. The process of preparing a foundry mold part having improved dimensional stability characteristics consisting of the steps of preparing a first admixture, said first admixture consisting essentially of about 30 percent by weight of a compound selected from the group consisting of anhydrous calcium sulfate and hemihydrate of calcium sulfate with about 70 percent by weight of silica flour and adding water thereto in sufficient amount to provide water of hydration to form substantially the dihydrate of said sulfate, allowing the resulting mass to set until the reaction of hydration is substantially complete, heating the composite thus obtained sufficiently to induce at least a partial interaction between the hydrate of calcium sulfate and silica and pulverizing the product obtained thereby, preparing a second admixture, said second admixture consisting essentially of about 30 percent by weight of a compound selected from the group consisting of anhydrous calcium sulfate and hemihydrate of calcium sulfate with about 70 percent by weight of silica flour and adding thereto an effective amount up to about 6 percent by weight of a dimensional stability improving agent consisting of powdered Portland cement, preparing a blend consisting essentially of substantially equal portions by weight of said first admixture with said second admixture, adding water to said blend in sufficient amount to render the resulting composition fluid for forming said mold part and allowing said composition to solidify in form of said mold part by chemical hydration thereof.

2. The process according to claim 1 wherein the resulting mold part is baked at a temperature of about 400° F. to remove substantially all uncombined water therefrom.

3. The composition of matter obtained in accordance with the process set forth in claim 1.

4. The process of preparing a foundry mold part having improved dimensional stability characteristics consisting of the steps of preparing a first admixture, said first admixture consisting essentially of about 30 percent by weight of a compound selected from the group consisting essentially of about 30 percent by weight of a compound selected from the group consisting of anhydrous calcium sulfate and hemihydrate of calcium sulfate with about 70 percent by weight of silica flour and adding water thereto in sufficient amount to provide water of hydration to form substantially the dihydrate of said sulfate, allowing the resulting mass to set until reaction of hydration is substantially complete, heating the composite thus obtained to a temperature of at least 265° F. to induce at least a partial interaction between the hydrate of calcium sulfate and silica and pulverizing the product obtained thereby, preparing a second admixture, said second admixture consisting essentially of about 30 percent by weight of a compound selected from the group consisting of anhydrous calcium sulfate and hemihydrate of calcium sulfate with about 70 percent by weight of silica flour and adding thereto an effective amount up to about 0.25 percent by weight of a dimensional stability improving agent consisting of powdered Portland cement, preparing a blend consisting essentially of substantially equal portions by weight of said first admixture with said second admixture, adding water to said blend in sufficient amount to render the resulting composition fluid for forming said mold part and allowing said composition to solidify in form of said mold part by chemical hydration thereof.

5. The process according to claim 4 wherein the resulting mold part is baked at a temperature of about 400° F. to remove substantially all uncombined water therefrom.

6. The composition of matter obtained in accordance with the process set forth in claim 4.

7. The method of preparing a foundry mold part having improved dimensional stability characteristics consisting of mixing a compound selected from the group consisting of anhydrous calcium sulfate and hemihydrate of calcium sulfate with silica flour, moistening the mixture sufficiently to provide the water of hydration of at least a portion of the calcium sulfate, allowing the moistened mix to set, heating the set mix sufficiently to cause a partial interaction between the hydrate of calcium sulfate and silica, pulverizing the interacted mass, mixing it with fresh unreacted compound selected from the group consisting of anhydrous calcium sulfate and hemihydrate of calcium sulfate and fresh unreacted silica flour, adding to the conglomerate thus obtained an effective amount up to about 6 percent by weight of a dimensional stability improving agent consisting of Portland cement, moistening the mass with water in sufficient amount to render the resulting composition fluid for forming said mold part and allowing the composition to solidify in form of said mold part by chemical hydration thereof.

8. The process recited in claim 7 in which the calcium sulfate calculated as the hemihydrate to the silica flour is as three is to seven by weight.

9. The composition of matter obtained in accordance with the process set forth in claim 7.

References Cited in the file of this patent

UNITED STATES PATENTS

| | | |
|---|---|---|
| 1,924,028 | Durand | Aug. 22, 1933 |
| 2,531,496 | Bean et al. | Nov. 28, 1950 |
| 2,539,408 | Ensign et al. | Jan. 30, 1951 |